(12) United States Patent
Miller et al.

(10) Patent No.: US 10,981,151 B2
(45) Date of Patent: Apr. 20, 2021

(54) POORLY CRYSTALLINE TRANSITION METAL MOLYBDOTUNGSTATE

(71) Applicant: UOP LLC, Des Plaines, IL (US)

(72) Inventors: Stuart R. Miller, Arlington Heights, IL (US); Susan C. Koster, Carpentersville, IL (US)

(73) Assignee: UOP LLC, Des Plaines, IL (US)

( * ) Notice: Subject to any disclaimer, the term of this patent is extended or adjusted under 35 U.S.C. 154(b) by 215 days.

(21) Appl. No.: 16/388,357

(22) Filed: Apr. 18, 2019

(65) Prior Publication Data

US 2020/0001282 A1    Jan. 2, 2020

Related U.S. Application Data

(60) Provisional application No. 62/692,020, filed on Jun. 29, 2018.

(51) Int. Cl.
| | | |
|---|---|---|
| *B01J 27/24* | (2006.01) | |
| *C01G 53/00* | (2006.01) | |
| *C10G 45/08* | (2006.01) | |
| *B01J 37/20* | (2006.01) | |
| *B01J 21/08* | (2006.01) | |
| *B01J 21/12* | (2006.01) | |
| *B01J 21/04* | (2006.01) | |

(52) U.S. Cl.
CPC ............ *B01J 27/24* (2013.01); *B01J 37/20* (2013.01); *C01G 53/006* (2013.01); *C10G 45/08* (2013.01); *B01J 21/04* (2013.01); *B01J 21/08* (2013.01); *B01J 21/12* (2013.01); *C01P 2002/72* (2013.01)

(58) Field of Classification Search
CPC ... B01J 21/04; B01J 21/08; B01J 21/12; B01J 23/007; B01J 23/8885; B01J 27/24; B01J 35/00; B01J 37/031; B01J 37/20; C01G 51/006; C01G 53/006; C10G 45/08; C01P 2002/72; C01P 2002/78
See application file for complete search history.

(56) References Cited

U.S. PATENT DOCUMENTS

| 4,820,677 A | 4/1989 | Jacobson et al. |
| 4,904,634 A | 2/1990 | Wieserman et al. |
| (Continued) | | |

FOREIGN PATENT DOCUMENTS

| CA | 2719157 A1 | 10/2009 |
| CA | 2620656 C | 3/2014 |
| (Continued) | | |

OTHER PUBLICATIONS

Amaya, "Unsupported sulfides obtained from high specific area mixed oxides as hydrotreating catalysts", Revista Facultad de Ingenieria, Universidad de Antioquia (2010), 56, 58-67, Language: Spanish, Database: CAPLUS.

(Continued)

*Primary Examiner* — Brian A McCaig

(57) ABSTRACT

A hydroprocessing catalyst or catalyst precursor has been developed. The catalyst is a poorly crystalline transition metal molybdotungstate material or a metal sulfide decomposition product thereof. The hydroprocessing using the crystalline ammonia transition metal molybdotungstate material may include hydrodenitrification, hydrodesulfurization, hydrodemetallation, hydrodesilication, hydrodearomatization, hydroisomerization, hydrotreating, hydrofining, and hydrocracking.

18 Claims, 1 Drawing Sheet

(56) References Cited

U.S. PATENT DOCUMENTS

| | | | |
|---|---|---|---|
| 5,278,121 | A | 1/1994 | Singhal et al. |
| 6,156,695 | A | 12/2000 | Soled et al. |
| 6,162,350 | A | 12/2000 | Soled et al. |
| 6,197,273 | B1 | 3/2001 | Nagano et al. |
| 6,280,610 | B1 | 8/2001 | Uragami et al. |
| 6,299,760 | B1 | 10/2001 | Soled et al. |
| 6,534,437 | B2 | 3/2003 | Eijsbouts et al. |
| 6,582,590 | B1 | 6/2003 | Riley et al. |
| 6,620,313 | B1 | 9/2003 | Demmin et al. |
| 6,635,599 | B1 | 10/2003 | Eijsbouts et al. |
| 6,652,738 | B2 | 11/2003 | Eijsbouts et al. |
| 6,712,955 | B1 | 3/2004 | Hou et al. |
| 6,783,663 | B1 | 8/2004 | Riley et al. |
| 6,863,803 | B1 | 3/2005 | Riley et al. |
| 6,929,738 | B1 | 8/2005 | Riley et al. |
| 7,229,548 | B2 | 6/2007 | Riley et al. |
| 7,232,515 | B1 | 6/2007 | Demmin et al. |
| 7,232,934 | B2 | 6/2007 | Saleh et al. |
| 7,288,182 | B1 | 10/2007 | Soled et al. |
| 7,513,989 | B1 | 4/2009 | Soled et al. |
| 7,538,066 | B2 | 5/2009 | Soled et al. |
| 7,544,632 | B2 | 6/2009 | Soled et al. |
| 7,591,942 | B2 | 9/2009 | Soled et al. |
| 7,605,107 | B2 | 10/2009 | Soled et al. |
| 7,608,558 | B2 | 10/2009 | Eijsbouts et al. |
| 7,648,941 | B2 | 1/2010 | Soled et al. |
| 7,686,943 | B2 | 3/2010 | Soled et al. |
| 7,691,257 | B2 | 4/2010 | Shih et al. |
| 7,709,412 | B2 | 5/2010 | Shih et al. |
| 7,749,937 | B2 | 7/2010 | Domokos et al. |
| 7,776,205 | B2 | 8/2010 | Soled et al. |
| 7,780,845 | B2 | 8/2010 | Soled et al. |
| 7,951,746 | B2 | 5/2011 | Bai et al. |
| 8,062,508 | B2 | 11/2011 | Soled et al. |
| 8,067,331 | B2 | 11/2011 | Eijsbouts-Spickova et al. |
| 8,080,492 | B2 | 12/2011 | Kuperman et al. |
| 8,173,570 | B2 | 5/2012 | Maesen et al. |
| 8,206,575 | B2 | 6/2012 | Maesen et al. |
| 8,216,958 | B2 | 7/2012 | Wu et al. |
| 8,318,628 | B2 | 11/2012 | Brun et al. |
| 8,343,887 | B2 | 1/2013 | Maesen et al. |
| 8,377,289 | B2 | 2/2013 | Li et al. |
| 8,383,543 | B2 | 2/2013 | Maesen et al. |
| 8,586,500 | B2 | 11/2013 | Kuperman et al. |
| 8,636,967 | B2 | 1/2014 | Canelon et al. |
| 8,846,560 | B2 | 9/2014 | Yang et al. |
| 2008/0280754 | A1 | 11/2008 | Toledo Antonio et al. |
| 2009/0114566 | A1 | 5/2009 | Chen et al. |
| 2012/0065056 | A1 | 3/2012 | Domokos et al. |
| 2012/0122653 | A1 | 5/2012 | Maesen et al. |
| 2012/0122659 | A1 | 5/2012 | Kuperman et al. |
| 2012/0172199 | A1 | 7/2012 | Yang et al. |
| 2013/0068662 | A1 | 3/2013 | Maesen et al. |
| 2013/0337996 | A1 | 12/2013 | Eijsbouts-Spickova et al. |
| 2014/0027350 | A1 | 1/2014 | Soled et al. |
| 2015/0292095 | A1 | 10/2015 | Haber et al. |
| 2017/0165644 | A1 | 6/2017 | Miller et al. |
| 2017/0165645 | A1 | 6/2017 | Miller et al. |
| 2017/0165646 | A1 | 6/2017 | Miller et al. |
| 2017/0165647 | A1 | 6/2017 | Miller et al. |
| 2017/0165648 | A1 | 6/2017 | Miller et al. |
| 2017/0165649 | A1 | 6/2017 | Miller et al. |
| 2017/0165650 | A1 | 6/2017 | Miller et al. |
| 2017/0165651 | A1 | 6/2017 | Miller et al. |
| 2017/0165652 | A1 | 6/2017 | Miller et al. |
| 2017/0165656 | A1 | 6/2017 | Miller et al. |
| 2017/0166605 | A1 | 6/2017 | Miller et al. |
| 2017/0218528 | A1 | 8/2017 | Zhang et al. |
| 2018/0169633 | A1 | 6/2018 | Millet et al. |
| 2019/0060873 | A1 | 2/2019 | Millet et al. |
| 2019/0060882 | A1 | 2/2019 | Miller et al. |

FOREIGN PATENT DOCUMENTS

| | | |
|---|---|---|
| CN | 102049265 A | 5/2011 |
| EP | 2103347 A1 | 9/2009 |
| RU | 2098181 C1 | 12/1997 |
| WO | 200042126 A1 | 7/2000 |
| WO | 2009061295 A1 | 5/2009 |
| WO | 2014033653 A2 | 3/2014 |

OTHER PUBLICATIONS

An, "Preparation of unsupported and mesoporous Ni-Mo-W sulfide catalysts by low temperature solid-state reaction", Journal of China University of Petroleum (Edition of Natural Science), v 31, n. 6, p. 156-160, Dec. 2007, ISSN: 16735005; Publisher: Ed. Off. Journal of the Univ. Petroleum, China. Language: Chinese.

Calderon-Magdaleno, "Effect of the amount of citric acid used in the preparation of NiMo/SBA-15 catalysts on their performance in HDS of dibenzothiophene-type compounds", Catalysis Today, v 220-222, p. 78-88, Mar. 2014; ISSN: 09205861; DOI: 10.1016/j.cattod.2013.06.002; Publisher: Elsevier.

Escobar, "Effect of ethylene glycol addition on the properties of P-doped NiMo/Al2O3 HDS catalysts: Part I. Materials preparation and characterization", Applied Catalysis B: Environmental, v 88, n. 3/4, p. 564-575, May 20, 2009; ISSN: 09263373; DOI: 10.1016/j.apcatb.2008.10.005; Publisher: Elsevier.

Gil-Llambias, "Hydrodesulfurization Catalysts Electrophoretic Study of Mo (Or W)-Co, Mo (Or W)-Ni, and Mo (Or W)-Ca Sulfided Phases", J. CataL, v 102, n. 1, p. 37-42, Nov. 1986; ISSN: 00219517; Publisher: Academic Press.

Levin, "Crystal Structure of an Ammonium Nickel Molybdate Prepared by Chemical Precipitation", Inorg. Chem. 1996, 35, 4191-4197.

Nava, "Effect of phosphorus addition on unsupported Ni-Mo-W sulfide catalysts prepared by the in situ activation of nickel/tetramethylammonium thiomolybdotungstate", Applied Catalysis A: General, v 303, n. 2, p. 177-184, Apr. 28, 2006; ISSN: 0926860X; DOI: 10.1016/j.apcata.2005.12.025; Publisher: Elsevier.

Vikulshin, "Influence of nature of precursors of aluminum nickel molybdenum catalysts on their performance in hydrodesulfurization", Neftekhimiya, v46, n. 5, p. 371-376, 2006; Language: Russian; ISSN: 00282421; Publisher: East View Publications.

Olivas, "Trimetallic NiMoW unsupported catalysts for HDS", ACS Division of Petroleum Chemistry, Inc. Preprints, v 50, n. 4, p. 372-374, Aug. 2005; ISSN: 05693799; Publisher: American Chemical Society.

Yin, "A novel porous ammonium nickel molybdate as the catalyst precursor towards deep hydrodesulfurization of gas oil", p. 873-878, 2013, ISSN: 0016-2361, Publisher: Elsevier Science.

Yin, "Mechanism of Hydrodesulfurization of dibenzothiophenes on unsupported NiMoW catalyst", Journal of Fuel Chemistry and Technology, v 41, n 8, p. 991-997, Aug. 2013; ISSN: 18725813; DOI: 10.1016/S1872-5813(13) 60043-2; Publisher: Science Press.

Zhang, "Solution synthesis of unsupported Ni—W—S hydrotreating catalysts", Catalysis Communications 8 (2007) 2232-2237.

Zhou, "Study on hydrodesulfurization process of diesel on unsupported catalyst", Petroleum Processing and Petrochemicals, v 44, n 10, p. 38-43, Oct. 2013; Language: Chinese; ISSN: 10052399; Publisher: Research Institute of Petroleum Processing, SINOPEC.

Clearfield, "Studies in Heavy-Metal Molybdates. I. Crystal Structure of a Basic Zinc Molybdate, NaZn2OH(H20) (Mo04)21a", Inorganic Chemistry, vol. 15, No. 2, 1976, 335-338.

Clearfield, "Preparation and Structure of Manganese Molybdates", Inorg. Chem. 1985, 24, 4606-4609.

Clearfield, "Studies in Heavy-Metal Molybdates. 2. Crystal Structure of Disodium Di-u-hydroxo-dizin(II) Molybdate", Inorganic Chemistry, vol. 16, No. 3, 1977, 628-631.

Duan, "Ternary Ni-Co-Mo oxy-hydroxide nanoflakes grown on carbon cloth for excellent supercapacitor electrodes", Materials Letters 208 (2017) 65-68.

(56) References Cited

OTHER PUBLICATIONS

Hsu, "Synthesis and characterization of mesoporous Ni-Co oxyhydroxides for pseudocapacitor application", Electrochimica Acta 94 (2013) 104-112.
Lien, "High-performance asymmetric supercapacitor consisting of Ni-Co-Cu oxy-hydroxide nanosheets and activated aarbon", Electrochemistry Communications 34 (2013) 323-326.
Xiao, "Remarkable improvement of the turn-on characteristics of a Fe2O3 photoanode for photoelectrochemical water splitting with coating a FeCoW oxy-hydroxide gel", Applied Catalysis B: Environmental 212 (2017) 89-96.
U.S. Appl. No. 16/189,057 Crystalline Oxy-Hydroxide Transition Metal Molybdotungstate, Miller et al. filed Nov. 30, 2018.
U.S. Appl. No. 16/189,501 Mixed Transition Metal Tungstate, Miller et al. filed Nov. 13, 2018.
U.S. Appl. No. 16/206,837 Highly Active Quaternary Metallic Materials Using Short-Chain Alkyl Quaternary Ammonium Compounds, Osman et al. filed Nov. 30, 2018.
U.S. Appl. No. 16/206,924 Chighly Active Quaternary Metallic Materials Using Short-Chain Alkyl Quaternary Ammonium Compounds, Osman et al. filed Nov. 30, 2018.
U.S. Appl. No. 16/198,613 Highly Active Trimetallic Materials Using Short-Chain Alkyl Quaternary Ammonium Compounds, Pan et al. filed Nov. 21, 2018.
U.S. Appl. No. 16/206,804 Highly Active Trimetallic Materials Using Short-Chain Alkyl Quaternary Ammonium Compounds, Osman et al. filed Nov. 30, 2018.
U.S. Appl. No. 16/206,867 Highly Active Quaternary Metallic Materials Using Short-Chain Alkyl Quaternary Ammonium Compounds, Osman et al. filed Nov. 30, 2018.
U.S. Appl. No. 16/206,898 Phighly Active Multimetallic Materials Using Short-Chain Alkyl Quaternary Ammonium Compounds, Osman et al. filed Nov. 30, 2018.
U.S. Appl. No. 16/388,418 Poorly Crystalline Transition Metal Tungstate, Miller et al. filed Apr. 18, 2018.
U.S. Appl. No. 16/388,447 Crystalline Transition Metal Tungstate, Miller et al. filed Apr. 18, 2018.
U.S. Appl. No. 16/388,463 Crystalline Transition Metal Molybdotungstate, Miller et al. filed Apr. 18, 2018.
U.S. Appl. No. 16/388,481 Transition Metal Tungstate Material, Miller et al. filed Apr. 18, 2018.
U.S. Appl. No. 16/388,495 Transition Metal Molybdotungstate Material, Miller et al. filed Apr. 18, 2018.
U.S. Appl. No. 16/388,524 Crystalline Transition Metal Tungstate, Miller et al. filed Apr. 18, 2018.

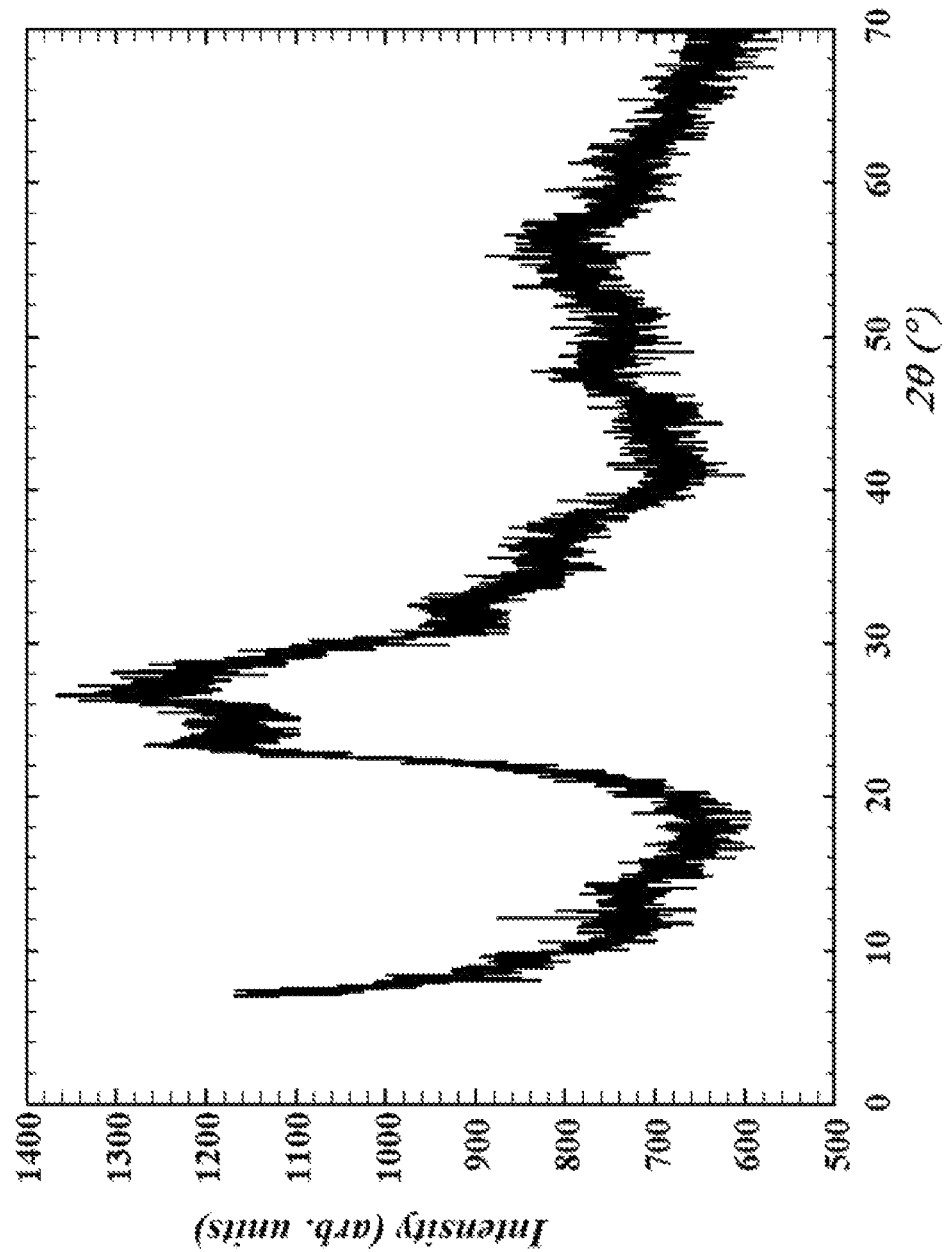

POORLY CRYSTALLINE TRANSITION METAL MOLYBDOTUNGSTATE

CROSS-REFERENCE TO RELATED APPLICATION

This application claims priority from Provisional Application No. 62/692,020 filed Jun. 39, 2018, the contents of which cited application are hereby incorporated by reference in its entirety.

FIELD OF THE INVENTION

This invention relates to a new catalyst such as a hydroprocessing catalyst. More particularly this invention relates to a poorly crystalline transition metal molybdotungstate and its use as a hydroprocessing catalyst. Hydroprocessing may include hydrodenitrification, hydrodesulfurization, hydrodemetallation, hydrodesilication, hydrodearomatization, hydroisomerization, hydrotreating, hydrofining, and hydrocracking.

BACKGROUND

In order to meet the growing demand for petroleum products there is greater utilization of sour crudes, which when combined with tighter environmental legislation regarding the concentration of nitrogen and sulfur within fuel, leads to accentuated refining problems. The removal of sulfur (hydrodesulfurization—HDS) and nitrogen (hydrodenitrification—HDN) containing compounds from fuel feed stocks is targeted during the hydrotreating steps of refining and is achieved by the conversion of organic nitrogen and sulfur to ammonia and hydrogen sulfide respectively.

Since the late 1940s the use of catalysts containing nickel (Ni) and molybdenum (Mo) or tungsten (W) have demonstrated up to 80% sulfur removal. See for example, V. N. Ipatieff, G. S. Monroe, R. E. Schaad, Division of Petroleum Chemistry, 115$^{th}$ Meeting ACS, San Francisco, 1949. For several decades now there has been an intense interest directed towards the development of materials to catalyze the deep desulfurization, in order to reduce the sulfur concentration to the ppm level. Some recent breakthroughs have focused on the development and application of more active and stable catalysts targeting the production of feeds for ultra-low sulfur fuels. Several studies have demonstrated improved HDS and HDN activities through elimination of the support such as, for example, $Al_2O_3$. Using bulk unsupported materials provides a route to increase the active phase loading in the reactor as well as providing alternative chemistry to target these catalysts.

More recent research in this area has focused on the ultra-deep desulfurization properties achieved by a Ni—Mo/W unsupported 'trimetallic' material reported in, for example, U.S. Pat. No. 6,156,695. The controlled synthesis of a broadly amorphous mixed metal oxide consisting of molybdenum, tungsten and nickel, significantly outperformed conventional hydrotreating catalysts. The structural chemistry of the tri-metallic mixed metal oxide material was likened to the hydrotalcite family of materials, referring to literature articles detailing the synthesis and characterization of a layered nickel molybdate material, stating that the partial substitution of molybdenum with tungsten leads to the production of a broadly amorphous phase which, upon decomposition by sulfidation, gives rise to superior hydrotreating activities.

The chemistry of these layered hydrotalcite-like materials was first reported by H. Pezerat, contribution à l'étude des molybdates hydrates de zinc, cobalt et nickel, C. R. Acad. Sci., 261, 5490, who identified a series of phases having ideal formulas $MMoO_4 \cdot H_2O$, $EHM_2O^-(MoO_4)_{2H2O}$, and $E_{2-x}(H_3O)_xM_2O(MoO_4)_2$ where E can be $NH_4^+$, $Na^+$ or $K^+$ and M can be $Zn^{2+}$, $Co^{2+}$ or $Ni^{2+}$.

Pezerat assigned the different phases he observed as being $\Phi c$, $\Phi x$ or $\Phi y$ and determined the crystal structures for $\Phi x$ and $\Phi y$, however owing to a combination of the small crystallite size, limited crystallographic capabilities and complex nature of the material, there were doubts raised as to the quality of the structural assessment of the materials. During the mid-1970s, Clearfield et al attempted a more detailed analysis of the $\Phi x$ and $\Phi y$ phases, see examples A. Clearfield, M. J. Sims, R. Gopal, Inorg. Chem., 15, 335; A. Clearfield, R. Gopal, C. H. Saldarriaga-Molina, Inorg. Chem., 16, 628. Single crystal studies on the product from a hydrothermal approach allowed confirmation of the $\Phi x$ structure, however they failed in their attempts to synthesize $\Phi y$ and instead synthesized an alternative phase, Na—Cu $(OH)(MoO_4)$, see A. Clearfield, A. Moini, P. R. Rudolf, Inorg. Chem., 24, 4606.

The structure of $\Phi y$ was not confirmed until 1996 when Ying et al. Their investigation into a room temperature chimie douce synthesis technique in the pursuit of a layered ammonium zinc molybdate led to a metastable aluminum-substituted zincite phase, prepared by the calcination of Zn/Al layered double hydroxide $(Zn_4Al_2(OH)_{12}CO_3 \cdot zH_2O)$. See example D. Levin, S. L. Soled, J. Y. Ying, Inorg. Chem., 1996, 35, 4191-4197. This material was reacted with a solution of ammonium heptamolybdate at room temperature to produce a highly crystalline compound, the structure of which could not be determined through conventional ab-initio methods. The material was indexed, yielding crystallographic parameters which were the same as that of an ammonium nickel molybdate, reported by Astier, see example M. P. Astier, G. Dji, S. Teichner, J. Ann. Chim. (Paris), 1987, 12, 337, a material belonging to a family of ammonium-amine-nickel-molybdenum oxides closely related to Pezerat's materials. Astier did not publish any detailed structural data on this family of materials, leading to Ying et al reproducing the material to be analyzed by high resolution powder diffraction in order to elucidate the structure. Ying et al named this class of materials 'layered transition-metal molybdates' or LTMs.

Since the initial reports of unsupported Ni—Mo/W oxidic precursors, U.S. Pat. No. 6,156,695, there have been several reports describing materials which, when sulfided, claim to have enhanced hydrotreating activities. U.S. Pat. No. 6,534,437 discloses a process for preparing a mixed metal catalyst having a powder x-ray diffraction pattern showing reflections at approximately 2.53 Angstroms and 1.70 angstroms. U.S. Pat. No. 6,534,437 differentiates itself from U.S. Pat. No. 3,678,124 and WO 9903578 based on characteristic full width half maximum line widths of more resolved reflections, present in WO 9903578, claiming that the invention of U.S. Pat. No. 6,534,437 possesses a 'different microstructure' from prior work, WO 9903578.

U.S. Pat. No. 8,722,563 describes preparing a series of catalyst precursors with compositions comprising at least one Group VI metal and one metal from Group VIII through Group X. One of the comparative examples described in the patent yields a comparable powder x-ray diffraction pattern to that obtained in U.S. Pat. No. 6,534,437 and is described as the as-synthesized and dried hexagonal $NiWO_4$ catalyst precursor.

U.S. Pat. No. 7,648,941 discloses synthetic examples of a series of different bimetallic materials and states that the bulk bimetallic catalyst of the invention has a metastable structure and further assert that the crystalline 2θ structure of the metastable hexagonal NiWO₄ phase in the preferred catalysts of the invention have lattice parameters a=2.92 Å, b=2.93 Å, and c=4.64 Å and that bulk catalyst has a metastable hexagonal structure having an X-ray diffraction pattern with a single reflection between 58 and 65°. As a point of reference, the largest two d-spacings which can be generated in an x-ray diffraction pattern by a hexagonal cell with lattice parameters a=2.92 Å, b=2.93 Å, and c=4.64 Å are 4.64 Å and 2.53 Å.

A. Dias and V. S. T. Ciminelli, *J. Eur. Ceramic. Soc*, 2001, 21, 2061-2065 reported on the thermodynamic calculations and modeling of hydrothermally synthesized nickel tungstates. They present a series of calculated yield diagrams at various synthesis temperatures highlighting the pH and reagent concentrations which yield NiWO₄. All their calculations predict the formation of a nickel tungstate between pH 2 and 7.5, with nickel hydroxide being the main product at higher pH's. The authors show the x-ray diffraction patterns for the samples produced at 200, 230 and 260° C. within and without their predicted yield zones. The x-ray diffraction pattern for the NiWO₄ material synthesized at 200° C. can be described as poorly crystalline and the reference asserts that it is important to note that a crystallized material was obtained at 200° C., but with extremely fine particle size indicated by broad X-ray diffraction peaks. The reference asserts this can be explained by the energy barrier for the precipitation, which is closely related to the nature of the rate-controlling step in the dominant formation process. The reference puts forth that higher reaction temperatures accelerate the crystallization process because of greater thermal energy to overcome the energy barrier for transformation, and a consequence, materials with higher crystallinity and/or particle size can be obtained. The reference suggests that the phase obtained at 200° C. is essentially a poorly crystalline, nano-wolframite (NiWO₄), and this conclusion is consistent with calculated yield diagrams of the reference.

Y. Bi, H. Nie, D. Li, S. Zeng, Q. Yang and M. Li, Chemical Communications, 2010, 46, 7430-7432 discuss the preparation of NiWO₄ nanoparticles as a promising hydrodesulfurization catalyst, stating that all the reflections in a typical powder x-ray diffraction pattern can be indexed undisputedly to the monoclinic NiWO₄, Wolframite, phase. The reference asserts that FIG. 1 shows the typical X-ray diffraction (XRD) pattern of the as-made sample and all reflections can be indexed undisputedly to the monoclinic NiWO₄ phase (JCPDS card 72-1189). The reference concludes that a close examination reveals that the reflections in the XRD pattern are a little broad, indicating the characteristic feature of nanosized materials.

SUMMARY OF THE INVENTION

A poorly crystalline transition metal molybdotungstate material has been produced and optionally sulfided, to yield an active catalyst or catalyst precursor such as a hydroprocessing catalyst. The poorly crystalline transition metal molybdotungstate material has a x-ray powder diffraction pattern showing broad peaks at 6.5, 3.75, 3.3 and 2.45 Å. The poorly crystalline transition metal molybdotungstate material has the formula:

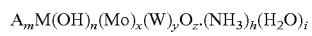

where 'A' is selected from $NH_4^+$, $H_3O^+$ or combinations thereof; m varies from 0.001 to 2, or from 0.01 to 1.5, or from 0.1 to 1; 'n' varies from 0.001 to 2; 'M' is a metal selected from Mn, Fe, Co, Ni, V, Cu, Zn and combinations thereof; 'x' varies from 0.001 to 2, or from 0.01 to 1, or from 0.1 to 0.5; 'y' varies from 0.4 to 3, or from 0.5 to 2, or from 0.6 to 1; 'z' is a number which satisfies the sum of the valency of the cationic species present in the material; 'h' varies from 0 to m; and 'i' varies from 0 to m; the material is further characterized by a x-ray powder diffraction pattern showing peaks at the d-spacings listed in Table A:

TABLE A

| d (Å) | I/I₀ (%) |
|---|---|
| 6.5 | w |
| 3.75 | vs |
| 3.3 | vs |
| 2.73 | m |
| 2.45 | w |
| 1.91 | w |

Another embodiment involves a method of making a poorly crystalline transition metal molybdotungstate material having the formula:

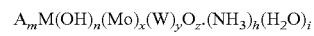

where 'A' is selected from $NH_4^+$, $H_3O^+$ or combinations thereof; m varies from 0.001 to 2, or from 0.01 to 1.5, or from 0.1 to 1; 'n' varies from 0.001 to 2; 'M' is a metal selected from Mn, Fe, Co, Ni, V, Cu, Zn and combinations thereof; 'x' varies from 0.001 to 2, or from 0.01 to 1, or from 0.1 to 0.5; y' varies from 0.4 to 3, or from 0.5 to 2, or from 0.6 to 1; 'z' is a number which satisfies the sum of the valency of the cationic species present in the material; 'h' varies from 0 to m; and 'i' varies from 0 to m; the material is further characterized by a x-ray powder diffraction pattern showing peaks at the d-spacings listed in Table A:

TABLE A

| d (Å) | I/I₀ (%) |
|---|---|
| 6.5 | w |
| 3.75 | vs |
| 3.3 | vs |
| 2.73 | m |
| 2.45 | w |
| 1.91 | w | the method comprising forming an reaction solution containing NH₃, H₂O, or combinations thereof, and sources of M, Mo and W; and reacting the mixture at elevated temperatures in an open or sealed vessel to generate a reaction product, recovering the reaction product and then drying the recovered reaction product at a temperature from about 100° C. to about 350° C. for about 30 minutes to about 48 hours to generate the poorly crystalline transition metal molybdotungstate material.

Yet another embodiment involves a conversion process comprising contacting a sulfiding agent with a material to generate metal sulfides which are contacted with a feed at conversion conditions to generate at least one product, the material comprising a poorly crystalline transition metal molybdotungstate material having the formula:

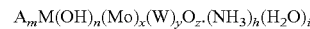

where 'A' is selected from $NH_4^+$, $H_3O^+$ or combinations thereof; m varies from 0.001 to 2, or from 0.01 to 1.5, or from 0.1 to 1; 'n' varies from 0.001 to 2; 'M' is a metal selected from Mn, Fe, Co, Ni, V, Cu, Zn and combinations thereof; 'x' varies from 0.001 to 2, or from 0.01 to 1, or from 0.1 to 0.5; 'y' varies from 0.4 to 3, or from 0.5 to 2, or from 0.6 to 1; 'z' is a number which satisfies the sum of the valency of the cationic species present in the material; 'h' varies from 0 tom; and 'i' varies from 0 to m; the material is further characterized by a x-ray powder diffraction pattern showing peaks at the d-spacings listed in Table A:

TABLE A

| d (Å) | $I/I_0$ (%) |
|---|---|
| 6.5 | w |
| 3.75 | vs |
| 3.3 | vs |
| 2.73 | m |
| 2.45 | w |
| 1.91 | w |

Additional features and advantages of the invention will be apparent from the description of the invention, FIGURES and claims provided herein.

BRIEF DESCRIPTION OF THE DRAWING

The FIGURE is the x-ray powder diffraction pattern of a poorly crystalline transition metal molybdotungstate material prepared by the method as described in the Examples.

DETAILED DESCRIPTION OF THE INVENTION

The present invention relates to a poorly crystalline transition metal molybdotungstate composition and a process for preparing the composition. The material has the designation UPM-20. This composition has an empirical formula:

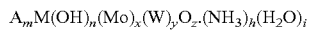
$$A_mM(OH)_n(Mo)_x(W)_yO_z\cdot(NH_3)_h(H_2O)_i$$

where 'A' is selected from $NH_4^+$, $H_3O^+$ or combinations thereof; m varies from 0.001 to 2, or from 0.01 to 1.5, or from 0.1 to 1; 'n' varies from 0.001 to 2; 'M' is a metal selected from Mn, Fe, Co, Ni, V, Cu, Zn and combinations thereof; 'x' varies from 0.001 to 2, or from 0.01 to 1, or from 0.1 to 0.5; y' varies from 0.4 to 3, or from 0.5 to 2, or from 0.6 to 1; 'z' is a number which satisfies the sum of the valency of the cationic species present in the material; 'h' varies from 0 tom; and 'i' varies from 0 to m.

The poorly crystalline transition metal molybdotungstate composition of the invention is characterized by having an extended network of M-O-M, where M represents a metal, or combination of metals listed above. The structural units repeat itself into at least two adjacent unit cells without termination of the bonding. The composition can have a one-dimensional network, such as, for example, linear chains.

The poorly crystalline transition metal molybdotungstate composition is further characterized by a x-ray powder diffraction pattern showing peaks at the d-spacings listed in Table A.

TABLE A

| d (Å) | $I/I_0$ (%) |
|---|---|
| 6.5 | w |
| 3.75 | vs |

TABLE A-continued

| d (Å) | $I/I_0$ (%) |
|---|---|
| 3.3 | vs |
| 2.73 | m |
| 2.45 | w |
| 1.91 | w |

The poorly crystalline transition metal molybdotungstate composition of the invention is further characterized by the x-ray powder diffraction pattern shown in the FIGURE.

The poorly crystalline transition metal molybdotungstate composition can be prepared by solvothermal crystallization of a reaction mixture, typically by mixing reactive sources of molybdenum and tungsten with the appropriate metal 'M'.

Sources of M, W, and Mo include, but are not limited to, the respective halide, sulfide, acetate, nitrate, carbonate, sulfate, oxalate, thiols, hydroxide salts, and oxides of M, W, or Mo. Specific examples of sources of M include, but are not limited to, manganese nitrate, manganese chloride, manganese bromide, manganese sulfate, manganese carbonate, manganese sulfide, manganese hydroxide, manganese oxide, copper nitrate, copper chloride, copper bromide, copper sulfate, copper carbonate, copper acetate, copper oxalate, copper sulfide, copper hydroxide, copper oxide, zinc nitrate, zinc chloride, iron bromide, zinc sulfate, zinc carbonate, zinc acetate, zinc oxalate, zinc sulfide, zinc hydroxide, zinc oxide, and any mixture thereof. Additional specific sources include nickel chloride, nickel bromide, nickel nitrate, nickel acetate, nickel carbonate, nickel hydroxide, cobalt chloride, cobalt bromide, cobalt nitrate, cobalt acetate, cobalt carbonate, cobalt hydroxide, cobalt sulfide, nickel chloride, cobalt oxide, nickel bromide, nickel sulfide, nickel oxide, iron acetate, iron oxalate, iron nitrate, iron chloride, iron bromide, iron sulfate, iron carbonate, iron oxalate, iron sulfide, iron oxide, magnesium chloride, vanadium chloride and any mixture thereof. Yet additional sources include, but are not limited to, molybdates, tungstates, thiomolybdates, and thiotungstates, such as molybdenum trioxide, ammonium dimolybdate, ammonium thiomolybdate, ammonium heptamolybdate, sodium dimolybdate, sodium thiomolybdate, sodium heptamolybdate, potassium dimolybdate, potassium thiomolybdate, potassium heptamolybdate, molybdenum sulfide, tungsten trioxide, tungstic acid, tungsten oxytetrachloride, tungsten hexachloride, hydrogen tungstate, ammonium ditungstate, sodium ditungstate, ammonium metatungstate, ammonium paratungstate, sodium ditungstate, sodium ditungstate, sodium metatungstate, sodium paratungstate, and any mixture thereof.

Generally, the process used to prepare the composition of this invention involves forming a reaction mixture wherein the components, such as for example, Ni, Mo, W, $NH_4OH$ and $H_2O$ are mixed together. By way of specific examples, a reaction mixture may be formed which in terms of molar ratios of the oxides is expressed by the formula:

$$MO_x:AMoO_y:BWO_z:C(NH_3):H_2O$$

where 'M' is selected from iron, cobalt, nickel, manganese, vanadium, copper, zinc, and combinations thereof 'x' is a number which satisfies the valency of 'M'; 'A' represents the ratio of 'Mo' relative to 'M' and varies from 0.0001 to 2, or from 0.01 to 1, or from 0.1 to 1; 'y' is a number satisfies the valency of 'Mo'; 'B' represents the ratio of 'W' relative to 'M' and varies from 0.4 to 3, or from 0.5 to 2, or from 0.7 to 1.25; 'z' is a number satisfies the valency of 'W'; 'C' represents the molar ratio of 'NH$_3$' and may vary from 0.1 to 100, or from 1 to 50, or from 2.5 to 25; the molar ratio of H$_2$O varies from 1 to 5000, or from 10 to 300, or from 20 to 100.

The reaction mixture comprising NH$_3$, H$_2$O, or a combination thereof, and sources of M, W, and Mo, is reacted at temperatures ranging from about 90° C. to about 350° C. for a period ranging from 30 minutes to around 14 days. In one embodiment, the temperate range for the reaction is from about 90° C. to about 120° C. and in another embodiment the temperature is in the range of from about 200° C. to about 250° C. In one embodiment, the reaction time is from about 2 to about 4 hours, and in another embodiment the reaction time is from about 4 to 7 days. The reaction may be carried out under atmospheric pressure or in a sealed vessel under autogenous pressure. In one embodiment, the synthesis may be conducted in an open vessel. The reaction product is then recovered. The recovery may be by evaporation of solvent, decantation, filtration, or centrifugation. Once recovered, the reaction product is dried at a temperature of from about 100° C. to about 350° C. for about 30 minutes to about 48 hours to generate the poorly crystalline transition metal molybdotungstate material. The poorly crystalline transition metal molybdotungstate compositions are characterized by their x-ray powder diffraction pattern as shown in Table A above and the FIGURE.

In the art of hydrothermal synthesis of metal oxides, it is well known that hydroxide defects occur in metal oxides made by this route and are located either internally as defects or externally as a result of often large external surface areas that are at least partially hydroxylated. These nonstoichiometric amounts of hydroxide moieties additively, together with the oxide ions, account for the collective valences of the metal ions in the compositions.

In one embodiment, an intermediate may be formed before reacting the reaction mixture. The intermediate is formed by removing at least some of the NH$_3$, H$_2$O, or a combination thereof to generate the intermediate which may be a precipitate, or at least a portion of the reaction mixture, or both a precipitate and a portion of the reaction mixture. The intermediate is then reacted as the reaction mixture at a temperature from about 90° C. to about 350° C. for a period of from about 30 minutes to 14 days to generate the reaction product which is then dried to form the transition metal molybdotungstate material.

Once formed, the poorly crystalline transition metal molybdotungstate may have a binder incorporated, where the selection of binder includes but is not limited to, anionic and cationic clays such as hydrotalcites, pyroaurite-sjogrenite-hydrotalcites, montmorillonite and related clays, kaolin, sepiolites, silicas, alumina such as (pseudo) boehomite, gibbsite, flash calcined gibbsite, eta-alumina, zicronica, titania, alumina coated titania, silica-alumina, silica coated alumina, alumina coated silicas and mixtures thereof, or other materials generally known as particle binders in order to maintain particle integrity. These binders may be applied with or without peptization. The binder may be added to the bulk crystalline transition metal molybdotungstate composition, and the amount of binder may range from about 1 to about 30 wt % of the finished catalysts or from about 5 to about 26 wt % of the finished catalyst. The binder may be chemically bound to the poorly crystalline transition metal molybdotungstate composition or may be present in a physical mixture with the poorly crystalline transition metal molybdotungstate composition.

At least a portion of the poorly crystalline transition metal molybdotungstate, with or without a binder, or before or after inclusion of a binder, can be sulfided in situ in an application or pre-sulfided to form metal sulfides which in turn are used in an application as a catalyst. The sulfidation may be conducted under a variety of sulfidation conditions such as through contact of the poorly crystalline transition metal molybdotungstate with a sulfiding agent such as sulfur containing stream or feedstream, through contact with a gaseous mixture of H$_2$S/H$_2$, or both. The sulfidation of the poorly crystalline transition metal molybdotungstate may be performed at elevated temperatures, typically ranging from 50 to 600° C., or from 150 to 500° C., or from 250 to 450° C. The materials resulting from the sulfiding step are referred to as metal sulfides which can be used as catalysts in conversion processes. As noted above, at least a portion of the metal sulfides may be present in a mixture with at least one binder. The sulfiding step can take place at a location remote from other synthesis steps, remote from the location of the conversion process, or remote from both the location of synthesis and remote from location of the conversion process.

As discussed, at least a portion of the poorly crystalline transition metal molybdotungstate of this invention can be sulfided and the resulting metal sulfides used as catalysts in conversion processes such as hydrocarbon conversion processes. Hydroprocessing is one class of hydrocarbon conversion processes in which the poorly crystalline mixed transition metal molybdotungstate, or metal sulfides derived therefrom, is useful as a catalyst. Examples of specific hydroprocessing processes are well known in the art and include hydrodenitrification, hydrodesulfurization, hydrodemetallation, hydrodesilication, hydrodearomatization, hydroisomerization, hydrotreating, hydrofining, and hydrocracking. In one embodiment, a conversion process comprises contacting the poorly crystalline mixed transition metal molybdotungstate with a sulfiding agent to generate metal sulfides which are contacted with a feed stream at conversion conditions to generate at least one product.

The operating conditions of the hydroprocessing processes listed above typically include reaction pressures from about 2.5 MPa to about 17.2 MPa, or in the range of about 5.5 to about 17.2 MPa, with reaction temperatures in the range of about 245° C. to about 440° C., or in the range of about 285° C. to about 425° C. Time with which the feed is in contact with the active catalyst, referred to as liquid hour space velocities (LHSV), should be in the range of about 0.1 h$^{-1}$ to about 10 h$^{-1}$, or about 2.0 h$^{-1}$ to about 8.0 h$^{-1}$. Specific subsets of these ranges may be employed depending upon the feedstock being used. For example, when hydrotreating a typical diesel feedstock, operating conditions may include from about 3.5 MPa to about 8.6 MPa, from about 315° C. to about 410° C., from about 0.25/h to about 5/h, and from about 84 Nm$^3$ H$_2$/m$^3$ to about 850 Nm$^3$ H$_2$/m$^3$ feed. Other feedstocks may include gasoline, naphtha, kerosene, gas oils, distillates, and reformate.

Any of the lines, conduits, units, devices, vessels, surrounding environments, zones or similar used in the process may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

Examples are provided below so that the invention may be described more completely. These examples are only by way of illustration and should not be interpreted as a limitation of the broad scope of the invention, which is set forth in the appended claims.

Patterns presented in the following examples were obtained using standard x-ray powder diffraction techniques. The radiation source was a high-intensity, x-ray tube operated at 45 kV and 35 mA. The diffraction pattern from the copper K-alpha radiation was obtained by appropriate computer based techniques. Powder samples were pressed flat into a plate and continuously scanned from 3° and 70° (2θ). Interplanar spacings (d) in Angstrom units were obtained from the position of the diffraction peaks expressed as θ, where θ is the Bragg angle as observed from digitized data. Intensities were determined from the integrated area of diffraction peaks after subtracting background, "$I_O$" being the intensity of the strongest line or peak, and "I" being the intensity of each of the other peaks. As will be understood by those skilled in the art the determination of the parameter 2θ is subject to both human and mechanical error, which in combination can impose an uncertainty of about ±0.4° on each reported value of 2θ. This uncertainty is also translated to the reported values of the d-spacings, which are calculated from the 2θ values. In some of the x-ray patterns reported, the relative intensities of the d-spacings are indicated by the notations vs, s, m, and w, which represent very strong, strong, medium, and weak, respectively. In terms of 100(I/$I_0$), the above designations are defined as:

w=0.01-15, m=15-60: s=60-80 and vs=80-100

In certain instances, the purity of a synthesized product may be assessed with reference to its x-ray powder diffraction pattern. Thus, for example, if a sample is stated to be pure, it is intended only that the x-ray pattern of the sample is free of lines attributable to crystalline impurities, not that there are no amorphous materials present. As will be understood to those skilled in the art, it is possible for different poorly crystalline materials to yield peaks at the same position. If a material is composed of multiple poorly crystalline materials, then the peak positions observed individually for each poorly crystalline material would be observed in the resulting summed diffraction pattern. Likewise it is possible to have some peaks appear at the same positions within different, single phase, crystalline materials, which may be simply a reflection of a similar distance within the materials and not that the materials possess the same structure.

Example 1

Ammonium metatungstate hydrate (17.71 g, 0.07 moles of W) and ammonium heptamolybdate tetrahydrate (5.3 g, 0.03 moles of Mo) and $NH_4OH$ (5.0 g, 0.048 moles of $NH_3$) were thoroughly mixed together prior to the addition of nickel nitrate hexahydrate (20 g, 0.069 moles of Ni) and zinc nitrate hexahydrate (2.3 g, 0.0077 moles Zn). The resultant material was mixed thoroughly prior to being heated at 65° C. for 24 hours in a sealed vessel. The resultant slurry was transferred to a ceramic dish and heated to a maximum of 200° C. for a further 24 hours. The resulting product was analyzed by X-ray powder diffraction, and the X-ray powder diffraction pattern is shown in the FIGURE.

Example 2

Using a ceramic dish, nickel nitrate hexahydrate (29 g, 0.1 moles of Ni), ammonium metatungstate hydrate (17.71 g, 0.07 moles of W) ammonium heptamolybdate tetrahydrate (1.76 g 0.01 moles of Mo) and ammonium carbonate (8.3 g, 0.17 moles of $NH_3$) were added together and mixed thoroughly prior to being heated to 70° C. The mixture transformed to a green slurry which was heated further at 300° C. with intermittent mixing for a 48 hour period. The resulting product was analyzed by X-ray powder diffraction, and the X-ray powder diffraction pattern is shown in the FIGURE.

Example 3

Using a ceramic dish, zinc nitrate hexahydrate (14.54 g, 0.049 moles of Zn), cobalt nitrate hexahydrate (1.87 g, 0.0064 moles of Co), ammonium metatungstate hydrate (17.71 g, 0.07 moles of W) ammonium heptamolybdate tetrahydrate (6.12 g 0.035 moles of Mo) and ammonium carbonate (30.76 g, 0.64 moles of $NH_3$) were mixed thoroughly before being heat treated for 12 hours at 150° C. with intermittent mixing. The mixture was then heat treated further at 350° C. for 24 hours. The resulting product was analyzed by X-ray powder diffraction, and the X-ray powder diffraction pattern is shown in the FIGURE.

Example 4

Nickel nitrate hexahydrate (29.75 g, 0.1 moles of Ni) ammonium metatungstate hydrate (17.71 g, 0.07 moles of W) ammonium heptamolybdate tetrahydrate (7.06 g 0.04 moles of Mo), urea (10 g, 0.167 moles) and deionized (DI) $H_2O$ (5 g, 0.278 moles) were mixed together in a sealed PTFE bottle. The mixture heat treated for 30 hours at 65° C. with intermittent mixing, prior to being transferred to a ceramic dish and heat treated at 200° C. The resulting product was analyzed by X-ray powder diffraction, and the X-ray powder diffraction pattern is shown in the FIGURE.

Embodiments

While the following is described in conjunction with specific embodiments, it will be understood that this description is intended to illustrate and not limit the scope of the preceding description and the appended claims.

A first embodiment of the invention is a poorly crystalline transition metal molybdotungstate material having the formula:

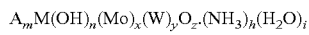

where 'A' is selected from $NH_4^+$, $H_3O^+$ or combinations thereof, m varies from 0.001 to 2; 'n' varies from 0.001 to 2; 'M' is a metal selected from Mn, Fe, Co, Ni, V, Cu, Zn and combinations thereof; 'x' varies from 0.001 to 2; 'y' varies from 0.4 to 3; 'z' is a number which satisfies the sum of the valency of the cationic species present in the material; 'h' varies from 0 to m; and 'i' varies from 0 to m; the material further characterized by a x-ray powder diffraction pattern showing peaks at the d-spacings listed in Table A:

TABLE A

| d (Å) | I/I$_0$ (%) |
|---|---|
| 6.5 | w |
| 3.75 | vs |
| 3.3 | vs |
| 2.73 | m |
| 2.45 | w |
| 1.91 | w |

An embodiment of the invention is one, any or all of prior embodiments in this paragraph up through the first embodiment in this paragraph wherein the poorly crystalline transition metal molybdotungstate material is present in a mixture with at least one binder and wherein the mixture comprises up to 25 wt-% binder. An embodiment of the invention is one, any or all of prior embodiments in this paragraph up through the first embodiment in this paragraph wherein the binder is selected from the group consisting of silicas, aluminas, and silica-aluminas. An embodiment of the invention is one, any or all of prior embodiments in this paragraph up through the first embodiment in this paragraph wherein M is nickel or zinc. An embodiment of the invention is one, any or all of prior embodiments in this paragraph up through the first embodiment in this paragraph wherein M is nickel.

A second embodiment of the invention is a method of making a poorly crystalline transition metal molybdotungstate material having the formula:

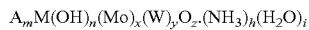

where 'A' is selected from $NH_4^+$, $H_3O^+$ or combinations thereof, m varies from 0.001 to 2; 'n' varies from 0.001 to 2; 'M' is a metal selected from Mn, Fe, Co, Ni, V, Cu, Zn and combinations thereof; 'x' varies from 0.001 to 2; 'y' varies from 0.4 to 3; 'z' is a number which satisfies the sum of the valency of the cationic species present in the material; 'h' varies from 0 to m; and 'i' varies from 0 to m; the material further characterized by a x-ray powder diffraction pattern showing peaks at the d-spacings listed in Table A:

TABLE A

| d (Å) | I/I$_0$ (%) |
|---|---|
| 6.5 | w |
| 3.75 | vs |
| 3.3 | vs |
| 2.73 | m |
| 2.45 | w |
| 1.91 | w | the method comprising forming a reaction mixture containing $NH_4^+$, $H_3O^+$ or combinations thereof, and sources of M, W, and Mo; reacting the mixture from about 90° C. to about 350° C. in an autogenous environment to form a reaction product; recovering the reaction product; and drying the recovered product at a temperature from about 100° C. to about 350 for about 30 minutes to about 48 hours to generate the poorly crystalline transition metal molybdotungstate material. An embodiment of the invention is one, any or all of prior embodiments in this paragraph up through the second embodiment in this paragraph further comprising removing at least some of the $NH_4^+$, $H_3O^+$, or a combination thereof to form an intermediate before reacting the mixture at a temperature from about 90° C. to about 350° C. in an autogenous environment An embodiment of the invention is one, any or all of prior embodiments in this paragraph up through the second embodiment in this paragraph wherein the reacting is conducted for a period from about 30 minutes to 14 days. An embodiment of the invention is one, any or all of prior embodiments in this paragraph up through the second embodiment in this paragraph wherein the recovering is by filtration or centrifugation. An embodiment of the invention is one, any or all of prior embodiments in this paragraph up through the second embodiment in this paragraph further comprising adding a binder to the recovered poorly crystalline transition metal molybdotungstate material. An embodiment of the invention is one, any or all of prior embodiments in this paragraph up through the second embodiment in this paragraph wherein the binder is selected from the group consisting of aluminas, silicas, and alumina-silicas. An embodiment of the invention is one, any or all of prior embodiments in this paragraph up through the second embodiment in this paragraph further comprising decomposing the recovered transition metal molybdotungstate material by sulfidation to form metal sulfides.

A third embodiment of the invention is a conversion process comprising contacting a feed with a catalyst at conversion conditions to give at least one product, the catalyst comprising a poorly crystalline transition metal molybdotungstate material having the formula:

where 'A' is selected from $NH_4^+$, $H_3O^+$ or combinations thereof, m varies from 0.001 to 2; 'n' varies from 0.001 to 2; 'M' is a metal selected from Mn, Fe, Co, Ni, V, Cu, Zn and combinations thereof; 'x' varies from 0.001 to 2; 'y' varies from 0.4 to 3; 'z' is a number which satisfies the sum of the valency of the cationic species present in the material; 'h' varies from 0 to m; and 'i' varies from 0 to m; the material further characterized by a x-ray powder diffraction pattern showing peaks at the d-spacings listed in Table A:

TABLE A

| d (Å) | I/I$_0$ (%) |
|---|---|
| 6.5 | w |
| 3.75 | vs |
| 3.3 | vs |
| 2.73 | m |
| 2.45 | w |
| 1.91 | w |

An embodiment of the invention is one, any or all of prior embodiments in this paragraph up through the third embodiment in this paragraph wherein the conversion process is hydroprocessing. An embodiment of the invention is one, any or all of prior embodiments in this paragraph up through the third embodiment in this paragraph wherein the conversion process is selected from the group consisting of hydrodenitrification, hydrodesulfurization, hydrodemetallation, hydrodesilication, hydrodearomatization, hydroisomerization, hydrotreating, hydrofining, and hydrocracking. An embodiment of the invention is one, any or all of prior embodiments in this paragraph up through the third embodiment in this paragraph wherein the poorly crystalline transition metal molybdotungstate material, or at least a portion of the metal sulfides, or both are present in a mixture with at least one binder and wherein the mixture comprises up to 25 wt-% binder. An embodiment of the invention is one, any or all of prior embodiments in this paragraph up through the third embodiment in this paragraph further comprising at least one of: sensing at least one parameter of the process and generating a signal or data from the sensing; or generating and transmitting a signal; or generating and transmitting data.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A poorly crystalline transition metal molybdotungstate material having the formula:

$$A_mM(OH)_n(Mo)_x(W)_yO_z.(NH_3)_h(H_2O)_i$$

where 'A' is selected from $NH_4^+$, $H_3O^+$ or combinations thereof, m varies from 0.001 to 2; 'n' varies from 0.001 to 2; 'M' is a metal selected from Mn, Fe, Co, Ni, V, Cu, Zn and combinations thereof; 'x' varies from 0.001 to 2; 'y' varies from 0.4 to 3; 'z' is a number which satisfies the sum of the valency of the cationic species present in the material; 'h' varies from 0 to m; and 'i' varies from 0 to m; the material further characterized by a x-ray powder diffraction pattern showing peaks at the d-spacings listed in Table A:

TABLE A

| d (Å) | I/I$_0$ (%) |
|---|---|
| 6.5 | w |
| 3.75 | vs |
| 3.3 | vs |
| 2.73 | m |
| 2.45 | w |
| 1.91 | w. |

2. The poorly crystalline transition metal molybdotungstate material of claim 1 wherein the poorly crystalline transition metal molybdotungstate material is present in a mixture with at least one binder and wherein the mixture comprises up to 25 wt-% binder.

3. The poorly crystalline transition metal molybdotungstate material of claim 2 wherein the binder is selected from the group consisting of silicas, aluminas, and silica-aluminas.

4. The poorly crystalline transition metal molybdotungstate material of claim 1 wherein M is nickel or zinc.

5. The poorly crystalline transition metal molybdotungstate material of claim 1 wherein M is nickel.

6. A method of making a poorly crystalline transition metal molybdotungstate material having the formula:

$$A_mM(OH)_n(Mo)_x(W)_yO_z.(NH_3)_h(H_2O)_i$$

where 'A' is selected from $NH_4^+$, $H_3O^+$ or combinations thereof, m varies from 0.001 to 2; 'n' varies from 0.001 to 2; 'M' is a metal selected from Mn, Fe, Co, Ni, V, Cu, Zn and combinations thereof; 'x' varies from 0.001 to 2; 'y' varies from 0.4 to 3; 'z' is a number which satisfies the sum of the valency of the cationic species present in the material; 'h' varies from 0 to m; and 'i' varies from 0 to m; the material further characterized by a x-ray powder diffraction pattern showing peaks at the d-spacings listed in Table A:

TABLE A

| d (Å) | I/I$_0$ (%) |
|---|---|
| 6.5 | w |
| 3.75 | vs |
| 3.3 | vs |
| 2.73 | m |
| 2.45 | w |
| 1.91 | w | the method comprising:
b. forming a reaction mixture containing $NH_4^+$, $H_3O^+$ or combinations thereof, and sources of M, W, and Mo;
c. reacting the mixture from about 90° C. to about 350° C. in an autogenous environment to form a reaction product;
d. recovering the reaction product; and
e. drying the recovered product at a temperature from about 100° C. to about 350° C. for about 30 minutes to about 48 hours to generate the poorly crystalline transition metal molybdotungstate material.

7. The method of claim 6 further comprising removing at least some of the $NH_4^+$, $H_3O^+$, or a combination thereof to form an intermediate before reacting the mixture at a temperature from about 90° C. to about 350° C. in an autogenous environment.

8. The method of claim 6 wherein the reacting is conducted for a period from about 30 minutes to 14 days.

9. The method of claim 6 wherein the recovering is by filtration or centrifugation.

10. The method of claim 6 further comprising adding a binder to the poorly crystalline transition metal molybdotungstate material.

11. The method of claim 10 wherein the binder is selected from the group consisting of aluminas, silicas, and alumina-silicas.

12. The method of claim 6 further comprising decomposing the transition metal molybdotungstate material by sulfidation to form metal sulfides.

13. A conversion process comprising contacting a material with a sulfiding agent to convert at least a portion of the material to a metal sulfide and contacting the metal sulfide with a feed at conversion conditions to give at least one product, the material comprising a poorly crystalline transition metal molybdotungstate material having the formula:

$$A_mM(OH)_n(Mo)_x(W)_yO_z.(NH_3)_h(H_2O)_i$$

where 'A' is selected from $NH_4^+$, $H_3O^+$ or combinations thereof, m varies from 0.001 to 2; 'n' varies from 0.001 to 2; 'M' is a metal selected from Mn, Fe, Co, Ni, V, Cu, Zn and combinations thereof; 'x' varies from 0.001 to 2; 'y' varies from 0.4 to 3; 'z' is a number which satisfies the sum of the valency of the cationic species present in the material; 'h' varies from 0 to m; and 'i' varies from 0 to m; the material further characterized by a x-ray powder diffraction pattern showing peaks at the d-spacings listed in Table A:

TABLE A

| d (Å) | I/I$_0$ (%) |
|---|---|
| 6.5 | w |
| 3.75 | vs |
| 3.3 | vs |
| 2.73 | m |
| 2.45 | w |
| 1.91 | w. |

14. The process of claim 13 wherein the conversion process is hydroprocessing.

15. The process of claim 13 wherein the conversion process is selected from the group consisting of hydrotreating and hydrocracking.

16. The process of claim 15 wherein hydrotreating consists of hydrodenitrification, hydrodesulfurization, hydrodemetallation, hydrodesilication, hydrodearomatization, hydroisomerization, and hydrofining.

17. The process of claim 13 wherein the poorly crystalline transition metal molybdotungstate material, or at least a portion of the metal sulfides, or both are present in a mixture with at least one binder and wherein the mixture comprises up to 25 wt-% binder.

18. The process of claim 13, further comprising at least one of:
sensing at least one parameter of the process and generating a signal or data from the sensing; or
generating and transmitting a signal; or
generating and transmitting data.

* * * * *